US011050703B2

(12) United States Patent
John et al.

(10) Patent No.: US 11,050,703 B2
(45) Date of Patent: Jun. 29, 2021

(54) SYSTEMS AND METHODS FOR UE-SPECIFIED PRIORITIZED SIP MESSAGING

(71) Applicant: Verizon Patent and Licensing Inc., Arlington, VA (US)

(72) Inventors: Toby Varughese John, Murphy, TX (US); Shashi Kotvali, Frisco, TX (US); Bibi M. Hakimzadeh, Fort Worth, TX (US); James S. Abraham, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/583,772

(22) Filed: Sep. 26, 2019

(65) Prior Publication Data

US 2021/0099413 A1 Apr. 1, 2021

(51) Int. Cl.
*H04L 12/58* (2006.01)
*H04L 29/06* (2006.01)
*H04W 12/06* (2021.01)
*H04W 4/14* (2009.01)
*H04W 4/20* (2018.01)
*H04W 28/02* (2009.01)

(52) U.S. Cl.
CPC .......... *H04L 51/26* (2013.01); *H04L 65/1006* (2013.01); *H04L 65/1069* (2013.01); *H04L 65/1073* (2013.01); *H04L 65/80* (2013.01); *H04W 4/14* (2013.01); *H04W 4/20* (2013.01); *H04W 12/06* (2013.01); *H04W 28/0215* (2013.01)

(58) Field of Classification Search
CPC ............ H04L 65/1006; H04L 65/1069; H04L 29/06027; H04L 41/0213; H04L 41/026; H04L 41/0266; H04L 43/16
See application file for complete search history.

(56) References Cited

U.S. PATENT DOCUMENTS 8,363,641 B2 * 1/2013 Jackson .............. H04L 47/2416
370/352

OTHER PUBLICATIONS

B. Campbell et al., "Session Initiation Protocol (SIP) Extension for Instant Messaging," Network Working Group Request for Comments 3428, Dec. 2002.
H. Schulzrinne et al., "Communications Resource Priority for the Session Initiation Protocol (SIP)," Network Working Group Request for Comments 4412, Feb. 2006.

* cited by examiner

*Primary Examiner* — Chandrahas B Patel

(57) ABSTRACT

A system described herein may provide for the prioritization of Session Initiation Protocol ("SIP") messages, transmitted by a User Equipment ("UE"), based on a priority class indicator included in the SIP messages by the UE. A Universal Integrated Circuit Card ("UICC") may store information indicating the priority class (e.g., in an Access Control Class ("ACC") Elementary File ("EF")). One or more network components, such as a Call Session Control Function ("CSCF") and/or a Messaging Application Server ("MAS") may prioritize the SIP message based on the priority class indicator included in the SIP message by the UE.

20 Claims, 7 Drawing Sheets

SYSTEMS AND METHODS FOR UE-SPECIFIED PRIORITIZED SIP MESSAGING

BACKGROUND

Wireless telecommunication networks provide network connectivity to a variety of different users, such as government agencies, first responders, corporate entities, private individuals, etc. These users send messages (e.g., text messages, instant messages, etc.) using devices that are connected to the wireless telecommunications networks. Some messaging techniques employ the use of Session Initiation Protocol ("SIP") messaging to facilitate the transmission of messages and/or the establishment of voice calls or other services.

DETAILED DESCRIPTION OF THE PREFERRED EMBODIMENTS

The following detailed description refers to the accompanying drawings. The same reference numbers in different drawings may identify the same or similar elements.

Embodiments described herein provide for the prioritized treatment of messages sent by UEs associated with a messaging priority class. Examples of UEs associated with a messaging priority class may include UEs associated with first responders (e.g., law enforcement, firefighters, paramedics, etc.), governmental agencies, and/or other entities that require and/or are otherwise entitled to prioritized message services. "Prioritized" messages may be processed (e.g., forwarded) by a wireless network prior to, and/or otherwise in favor of, "non-prioritized" messages, for example when excessive congestion or load prevents the expedient processing of messages.

Figure 1:
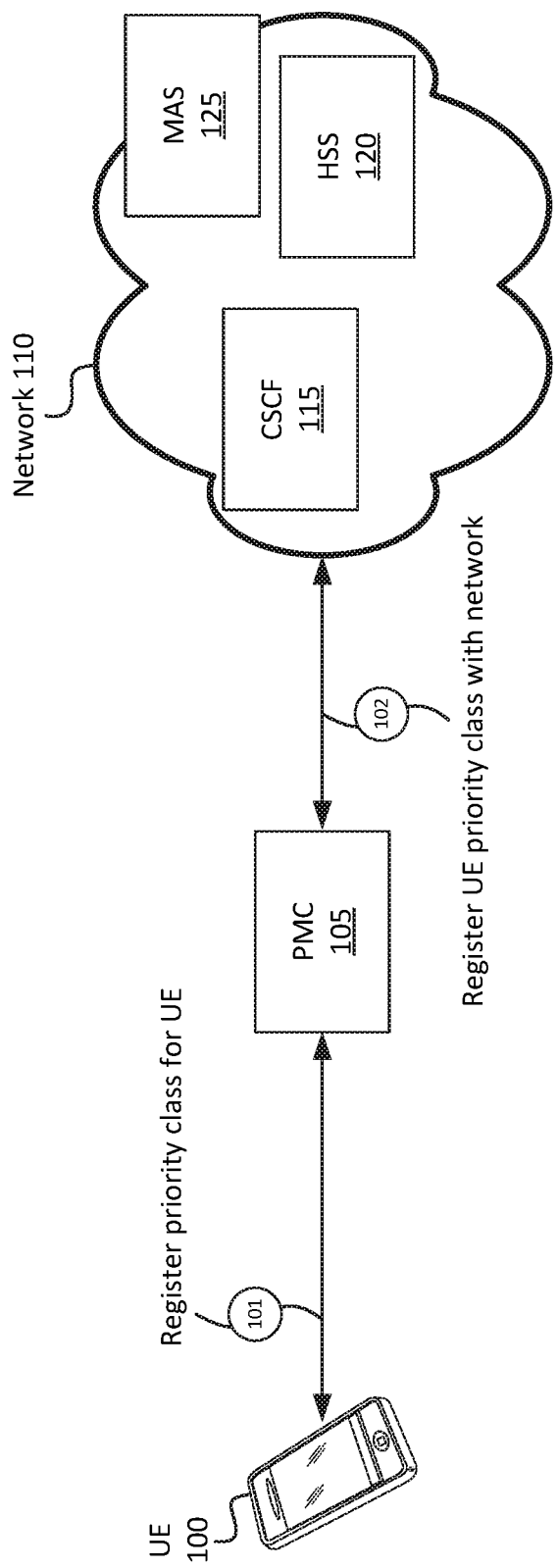
FIG. 1 illustrates an example overview of one or more embodiments described herein, in which a User Equipment ("UE") may be registered as being associated with a messaging priority class.

For instance, as shown in FIG. 1, a particular UE 100 may be registered (at 101) with a messaging priority class. In some aspects, when UE 100 is initially provisioned for network 110 (and/or at some other time), UE 100 may be registered with Priority Messaging Component ("PMC") 105. The indicated priority class may be selected from a group of different priority classes, where each priority class receives differentiated priority treatment by network 110. For instance, five, ten, fifteen, or some other quantity of priority classes may be configurable. The particular priority class for UE 100 may, in some embodiments, be selected based on an entity that owns and/or operates UE 100. For instance, a particular UE that is owned and/or operated by a fire department may be associated with a higher access class than another UE that is owned and/or operated by a private individual.

The provisioning may include providing identifying information associated with UE 100 to PMC 105. The identifying information may include, for example, a Mobile Directory Number ("MDN") associated with UE 100, an International Mobile Station Equipment Identity (IMEI) value, an International Mobile Subscriber Identity ("IMSI") value, identifying information stored by a Universal Integrated Circuit Card ("UICC") associated with UE 100, a SIP address associated with UE 100 or a user of UE 100, and/or some other suitable identifying information.

In some embodiments, PMC 105 may generate an authentication token for UE 100. PMC 105 may, in some embodiments, derive the authentication token from some or all of the identifying information of UE 100. For instance, PMC 105 may perform a cryptographic hash, and/or some other function, on some or all of the identifying information of UE 100 to generate the authentication token. PMC 105 may store the authentication token, provide the authentication token to UE 100, and/or provide the authentication token to one or more other devices or systems.

The registration may also include storing information locally at UE 100, such as on a UICC associated with UE 100. For instance, the UICC may include a data structure in which an Access Control Class ("ACC") is stored (e.g., an ACC Elementary File ("EF")), indicating a priority level of UE 100. In accordance with some embodiments, the ACC EF of the UICC (and/or some other suitable data structure stored locally at UE 100) may store a value that indicates the messaging priority class associated with UE 100. The value may be indicated by, for instance, a numerical value, a setting of one or more bits in a sequence of bits, a word or phrase, and/or using some other suitable indicator.

PMC 105 may, in some embodiments, also register (at 102) UE 100 with network 110. For instance, PMC 105 may communicate with Call Session Control Function ("CSCF") 115, Home Subscriber Server ("HSS") 120, Messaging Application Server ("MAS") 125, and/or one or more other devices or systems to register UE 100. In some embodiments, CSCF 115 and MAS 125 may part of an Internet Protocol ("IP") multimedia subsystem ("IMS") core of network 110. PMC 105 may, for example, provide some or all of the identifying information associated with UE 100 mentioned above (e.g., MDN, IMSI, IMEI, and/or other identifying information) to network 110 (e.g., to CSCF 115, HSS 120, or MAS 125). PMC 105 may also provide, to network 110, an indication of the priority class associated with UE 100. In some embodiments, PMC 105 may also provide an authentication token (e.g., as previously discussed above) to network 110, in conjunction with identifying information for UE 100 and an indication of the priority class associated with UE 100, so that network 110 can subsequently verify the access class of UE 100 when communicating with UE 100.

Figure 2:
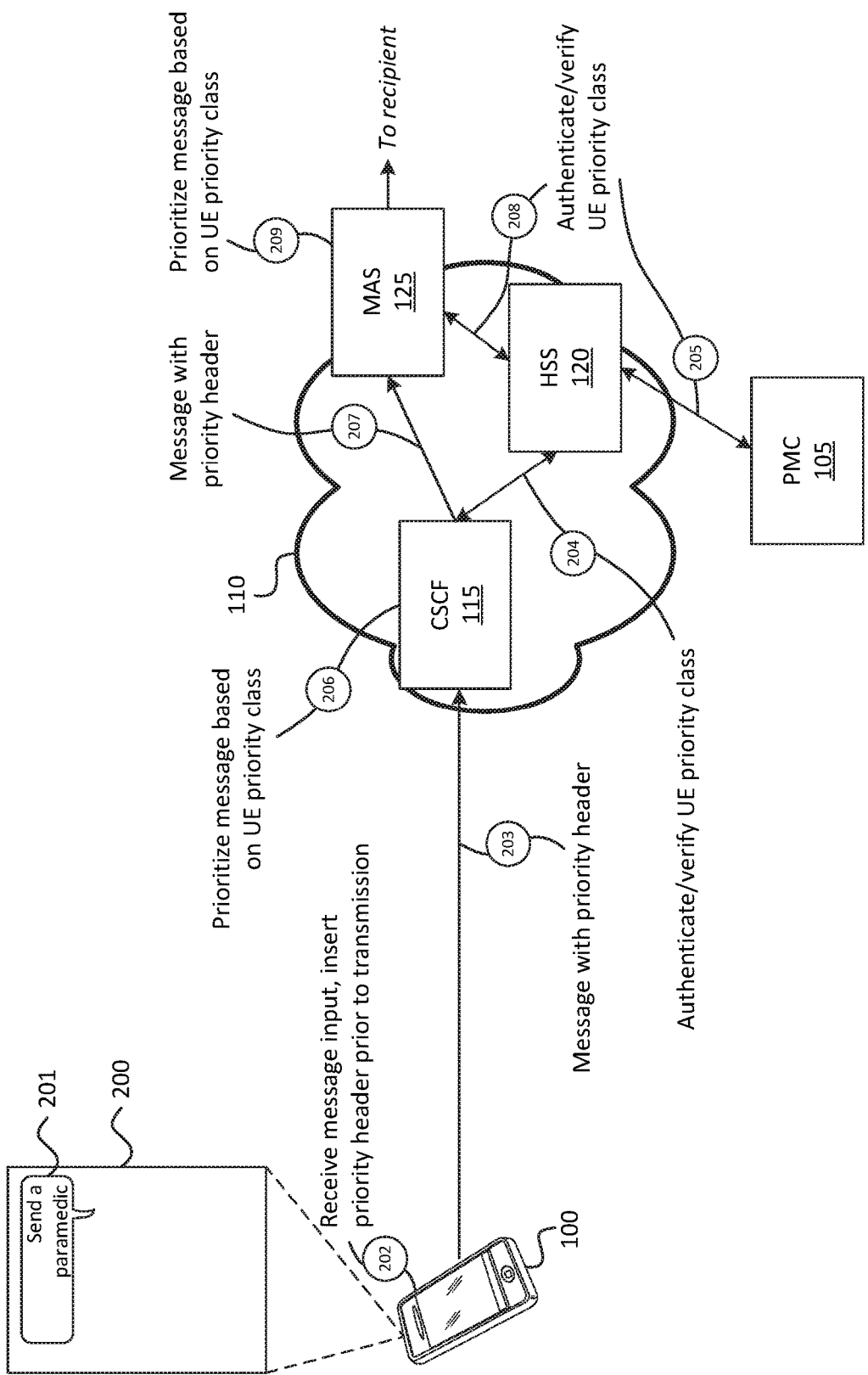
FIG. 2 illustrates an example overview of one or more embodiments described herein, in which a UE inserts a priority header into a message in accordance with a messaging priority class associated with the UE in order for the message to be handled according to the messaging priority class of the UE.

For example, as shown in FIG. 2, UE 100 may present messaging UI 200, via which a user of UE 100 inputs message 201 ("Send a paramedic"). UE 100 may receive (at 202) the message input, and may insert header information, indicating the priority class of UE 100, prior to outputting the message. As described below, a messaging application of UE 100 may obtain the priority class from a UICC associated with UE 100 (e.g., by reading an ACC EF stored by the UICC). In some embodiments, UE 100 may also include an authentication token with the message (e.g., in header information associated with the message).

UE 100 may output (at 203) the message to network 110. The message may include header information, which in some aspects includes identifying information for UE 100, an indicator of the message priority class associated with UE 100, the authentication token provided by PMC 105, and/or other information, or any combination thereof. For instance, the message output by UE 100 may be, or may include, a SIP message (e.g., of the type "SIP MESSAGE") that includes (e.g., in a header of the SIP message) a SIP address associated with UE 100 and an indicator (e.g., in a "Resource-Priority" field or other suitable field) of the priority class of UE 100. The SIP header may also include an indicator of the types of services with which the priority class is associated. For example, the SIP header may include, in the Resource-Priority field, values of "ets.0" and/or "wps.0" —where "ets" refers to emergency telecommunications service, "wps" refers to wireless priority service, and "0" refers to the priority class for these types of communications. In some embodiments, UE 100 may have been registered (e.g., at 101) for different priority classes for different types of applications or services. In some such embodiments, the SIP header for all SIP messages from UE 100 may include an identification of different services, as well as the priority class for UE 100 for each of the different services. In some embodiments, an SIP header, from UE 100, for SIP messages according to a first type of service (e.g., a voice call service) may include a priority class for that type of service, while an SIP header for SIP messages according to a second type of service (e.g., a text messaging service) may include a priority class for the second type of service.

As shown, one or more components of network 110 may process the message according to the priority class indicated in the priority header. For example, CSCF 115 may receive the message, and may authenticate and/or verify (at 204) the priority class of UE 100 before processing the message according to the priority class indicated in the priority header. For example, CSCF 115 may communicate (at 204) with HSS 120 to verify the priority class of UE 100, as indicated in the priority header of the message from UE 100. For example, CSCF 115 may query HSS 120 (e.g., based on identifying information regarding UE 100) to determine with which priority classes, if any, UE 100 is associated. In some embodiments, CSCF 115 may provide an authentication token, included in the message from UE 100, to HSS 120 to verify the authenticity of the authentication token. In some embodiments, HSS 120 may communicate with PMC 105 to verify the priority class(es) associated with UE 100, and/or to authenticate the authentication token. In addition to, or in lieu of communicating with HSS 120, CSCF 115 may communicate directly with PMC 105 to determine with which priority classes, if any, UE 100 is associated, and/or to authenticate the authentication token. In some embodiments, CSCF 115 may forgo verifying the priority class (e.g., may forgo communicating with HSS 120 and/or with PMC 105 to verify the priority class), and may process the message according to the priority class indicated in the priority header without further verification.

CSCF 115 may prioritize (at 205) the message based on the priority class indicated in the header (e.g., after verifying (at 204) the priority class, in some embodiments). For example, CSCF 115 may process, queue, forward, or otherwise handle the message prior to processing, queuing, or forwarding other messages from other UEs (e.g., messages of a lower priority class, or messages that do not have an indicated priority class), even if the other messages were received by CSCF 115 before the message from UE 100.

CSCF 115 may proceed to forward (at 207) the message to MAS 125, which may be a device or system that implements a messaging service, by which the message from UE 100 may be forwarded to its intended recipient. MAS 125 may, for example, receive the message with the priority header and, in some embodiments, the authentication token. As similarly described above with respect to arrows 204 and 205, MAS 125 may authenticate and/or verify (at 208) the priority class indicated in the priority header. For example, MAS 125 may communicate with HSS 120 and/or PMC 105 to verify the priority class indicated in the priority header, and/or may verify the authentication token included with the message. Once MAS 125 has verified the priority class associated with UE 100, MAS 125 may handle (at 209) the message in a prioritized manner (e.g., may prioritize the message over messages from other UEs, which are associated with lower priority classes and/or are not associated with a priority class). For example, MAS 125 may forward the message toward its intended recipient before forwarding another message from another UE, which is associated with a lower priority class and/or are not associated with a priority class.

The use of SIP headers, in accordance with embodiments described herein, may facilitate the priority handling of messages, based on the content of the messages and/or based on a sender of the messages. For example, messages may be encrypted and/or otherwise unreadable by one or more network components (e.g., by CSCF 115, MAS 125, etc.), and those network components may not be able to analyze the messages to determine whether the messages should be prioritized. Thus, using SIP headers allows these network components to process the messages in a prioritized manner, when applicable.

Figure 3:
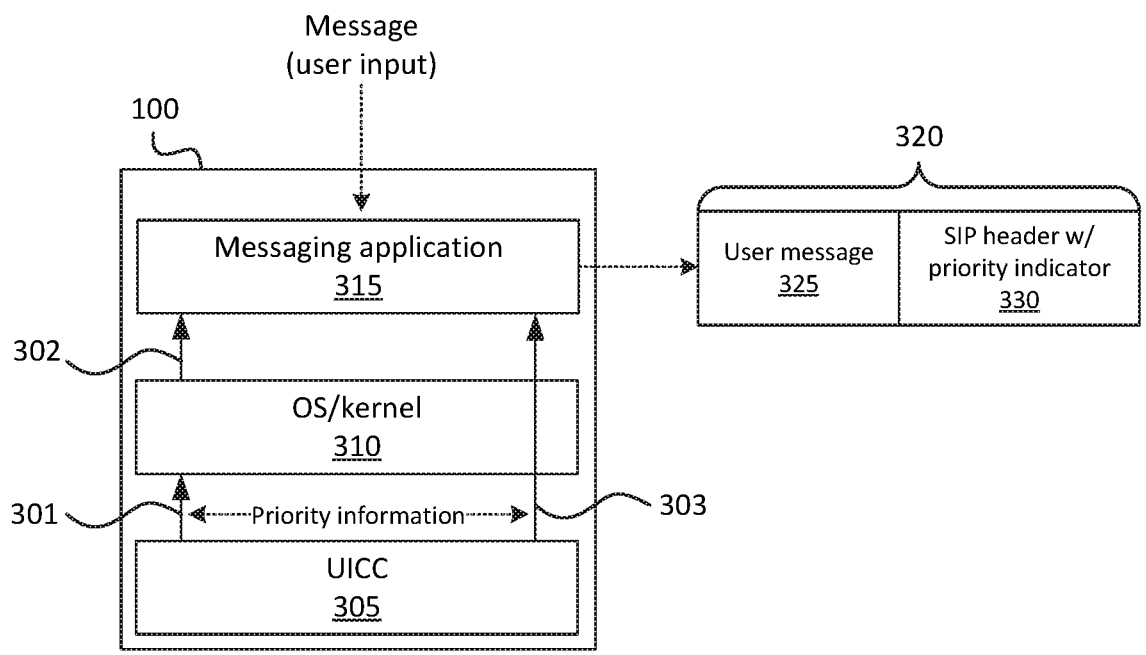
FIG. 3 illustrates an example of a messaging application, executing on a UE that is associated with a messaging priority class, obtaining priority information from a Universal Integrated Circuit Card ("UICC") and providing the priority information with a user message.

As shown in FIG. 3, UE 100 may include one or more functional components, such as UICC 305, operating system ("OS")/kernel 310, and messaging application 315. As similarly discussed above, UICC 305 may receive and store priority class information for UE 100, such as in an ACC EF portion of UICC 305. In some embodiments, priority class information may be provided to UICC 305 when UE 100 is first provisioned, purchased, set up, etc. with network 110. Additionally, or alternatively, the priority information may be provided to UICC 305 at some other time (e.g., after UE 100 has been initially provisioned with network 110, such as via an over-the-air ("OTA") update or through some other suitable process).

In some embodiments, OS/kernel 310 of UE 100 may obtain (at 301) the priority class information from UICC 305. For example, OS/kernel 310 may read the contents of UICC 305 to determine the priority class information. In some embodiments, OS/kernel 310 may store the priority class (e.g., as a global system variable). Messaging application 315 may obtain (at 302) the priority class information from OS/kernel 310 (e.g., via an application programming interface ("API") or some other suitable communication pathway). Additionally, or alternatively, messaging application 315 may read (at 303) UICC 305 directly. Once messaging application 315 obtains the priority class information for UE 100, messaging application 315 may generate message 320, which may include user message 325 (e.g., text or other content input by a user of UE 100, via messaging application 315) and SIP header 330 (which may include an indicator of the priority class).

Figure 4:
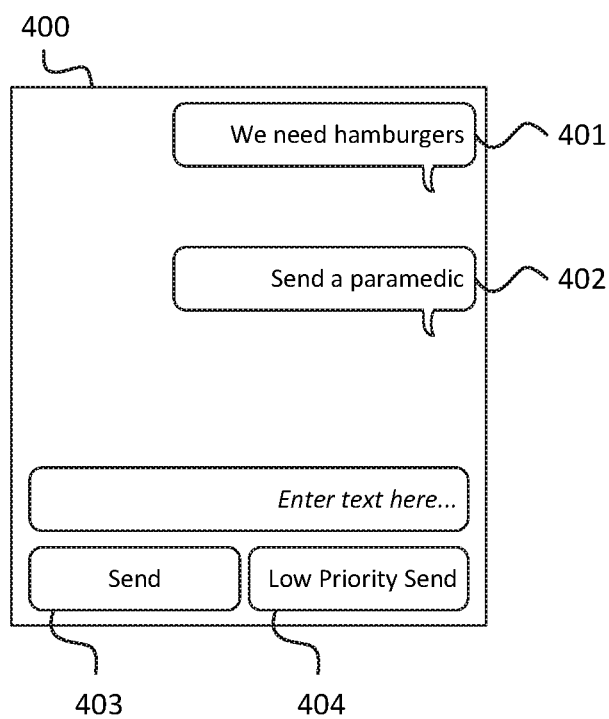
FIG. 4 illustrates an example user interface ("UI"), in which a selectable option may be used to indicate whether a message is a priority message.

In some embodiments, some messages of a given type (e.g., Short Message Service ("SMS") messages, Multimedia Messaging Service ("MMS") messages, instant messages, and/or other types of messages) from UE 100 may be associated with a particular priority class, while other messages of the same type may be associated with a different priority class (or no priority class). As shown in FIG. 4, for instance, UI 400 may be associated with a messaging application of UE 100, and may allow a user of UE 100 to input messages (e.g., SMS messages 401 and 402). UI 400 may also include selectable options, such as buttons 403 and 404. Button 403 may be selectable to send a message according to the priority class associated with UE 100 (e.g., the priority class for SMS messages from UE 100), while button 404 may be selectable to send a message according to a lower priority class (and/or no priority class). A user may desire to select a "low priority send" option (e.g., button 404) for messages that the user does not consider urgent (e.g., message 401, "We need hamburgers"), while the user may desire to use the default "send" option (e.g., button 403) for messages that the user considers urgent (e.g., message 402, "Send a paramedic"). For example, in some scenarios, using the "low priority send" option may incur less costs to a billing account associated with the user than the default "send" option. While FIG. 4 shows two selectable options for different priority class levels, in some embodiments, three or more selectable options may be presented, with each selectable option representing a different priority class. Further, while FIG. 4 is illustrated with an example "Low priority send" button 404, in some embodiments, UI 400 may include one or more "High priority send" buttons in addition to, or in lieu of, a "Low priority send" button.

In some embodiments, UE 100 (e.g., messaging application 315 and/or some other component of UE 100) may automatically select a priority class for a particular message, based on content of the message. For example, UE 100 may use Natural Language Processing ("NLP") and/or other techniques to determine a meaning or intent of words and/or phrases in the message, and determine whether the meaning or intent of the message is associated with a meaning or intent for which a high- or low-priority message should be sent. For example, UE 100 may determine that messages that include words and/or phrases directed to emergency situations (e.g., crimes in progress, fires, medical emergencies, etc.) should be sent with a higher priority (e.g., with an indicator of the priority class associated with UE 100) than messages that do not include such words and/or phrases. For instance, messaging application 315 may determine that message 401 ("We need hamburgers") should be sent with a lower priority than message 402 ("Send a paramedic"). In some embodiments, UE 100 may score the content of the message based on severity, and may dynamically select a priority class (e.g., from a set of three or more possible priority classes, where the highest priority class of the set is the highest priority class associated with UE 100) based on the score.

For instance, if UE 100 is associated with an example priority class of 4, on a scale of 1-(with 10 being the highest priority class), and UE 100 determines that a particular message has a severity score of 30, on a scale of 1-100, UE 100 may determine that the message should be output with an indicator of a priority class of 2. As another example, if UE 100 determines that a particular message has a severity score of 99, UE 100 may determine that the message should be output with an indicator of a priority class of 4 (e.g., the highest available priority class for UE 100). In some embodiments, different priority classes may be associated with different severity score thresholds. For example, a priority class of 3 may be associated with a severity score threshold of 50, while a priority class of 4 may be associated with a severity score threshold of 75. In other exemplary aspects, any message transmitted by a UE associated with a particular priority class is treated equally by the messaging application and equal priority information is transmitted with the output sent to the network 110.

Figure 5:
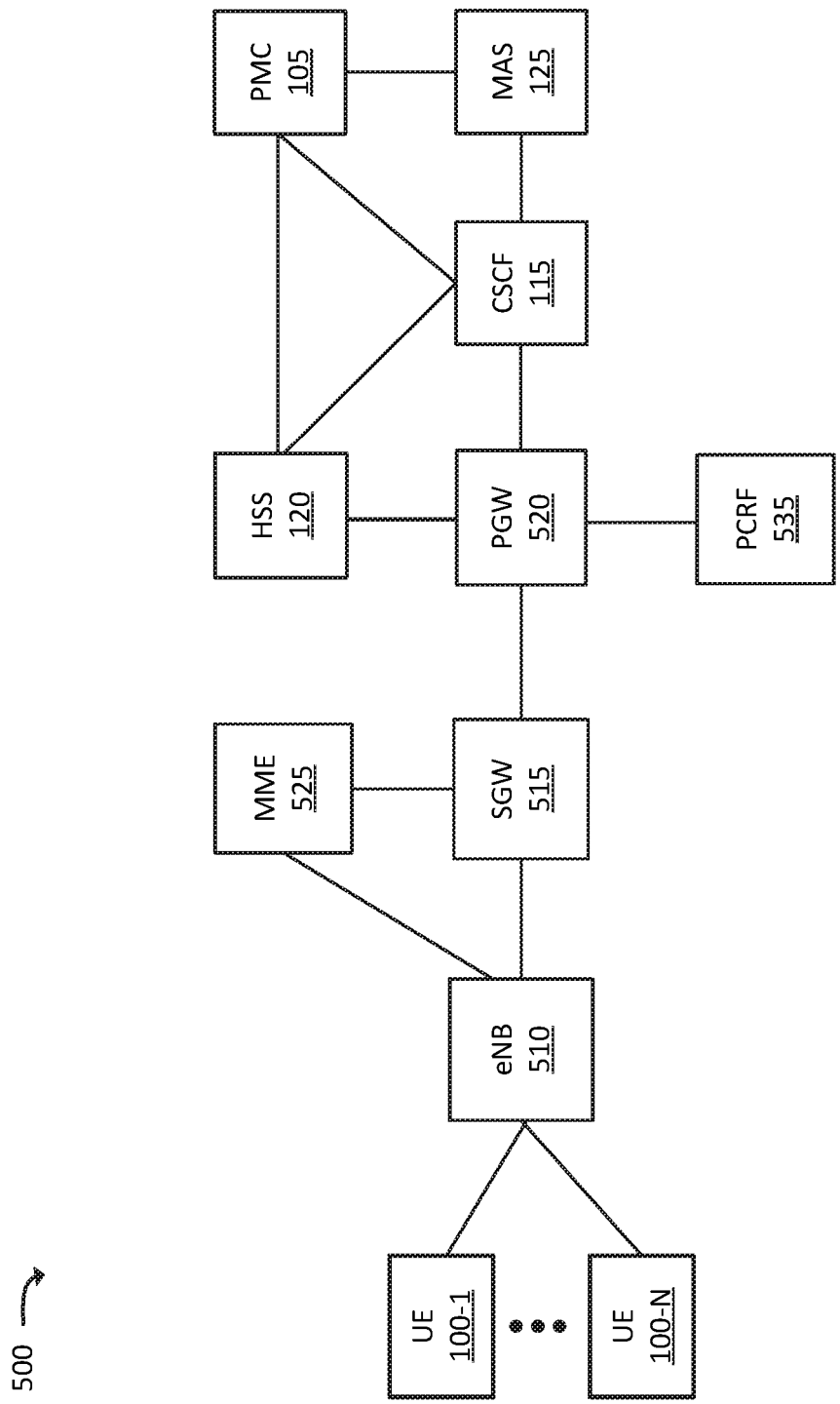
FIG. 5 illustrates an example environment in which one or more embodiments, described herein, may be implemented.

FIG. 5 is a diagram of an example environment 500 in which systems and/or methods described herein may be implemented. Environment 500 may include UEs 100-1 through 100-N (referred to individually as "UE 100" and collectively as "UEs 100"), one or more radio access networks ("RANs"), a wireless telecommunication core network, and one or more external networks. The wireless telecommunication core network may include an Evolved Packet System ("EPS") that includes a Long-Term Evolution ("LTE") network and/or an evolved packet core ("EPC") network that operates based on a 3rd Generation Partnership Project ("3GPP") wireless communication standard. The LTE network may be, or may include, RANs that include one or more base stations, some or all of which may take the form of enhanced Node Bs ("eNBs") 510, via which UEs 100 may communicate with the EPC network.

The EPC network may include Serving Gateway ("SGW") 515, Packet Data Network ("PDN") Gateway ("PGW") 520, Mobility Management Entity ("MME") 525, HSS 120, and Policy and Charging Rules Function ("PCRF") 535. The EPC network may enable UEs 100 to communicate with one or more external networks, such as a Public Land Mobile Networks ("PLMN-"), a Public Switched Telephone Network ("PSTN"), and/or an IP network (e.g., the Internet).

The wireless telecommunications network may also include an IMS core, which may include MAS 125, CSCF 115, and PMC 105. The IMS core may facilitate the delivery of IP-based multimedia services, such as Voice over IP ("VoIP") services, text-based messaging (e.g., SMS messaging, MMS messaging, or the like), video calling services, etc., to UEs 100. The IMS core may operate based on one or more 3GPP wireless communication standards.

UE 100 may include a portable computing and communication device, such as a personal digital assistant ("PDA"), a "smart" phone, a cellular phone, a laptop computer, a tablet computer, etc. UE 100 may also include a non-portable computing device, such as a desktop computer, a consumer or business appliance, a "smart" television, or another device that has the ability to connect to the wireless telecommunications network. UE 100 may, in some embodiments, include a computing and communication device that may be worn by a user (also referred to as "wearable" devices) such as a watch, a fitness band, a necklace, glasses, a ring, a belt, a headset, and/or another type of wearable device.

As further shown, eNB 510 may include one or more network devices that receive, process, and/or transmit traffic, such as voice calls and data, destined for and/or received from UE 100. Additionally, eNB 510 may receive traffic from and/or send traffic to external networks or other devices via SGW 515 and PGW 520. Furthermore, eNB 510 may send traffic to and/or receive traffic from UEs 100 via an air interface.

SGW 515 may aggregate traffic received from one or more eNBs 510 and may send the aggregated traffic to another network or device via PGW 520. Additionally, SGW 515 may aggregate traffic received from one or more PGWs 520 and may send the aggregated traffic to one or more eNBs 510. SGW 515 may operate as an anchor for user plane traffic during inter-eNB handovers and as an anchor for mobility between different telecommunication networks.

PGW 520 may include one or more network devices that serve as an interface between the core network and one or more external networks, devices, or systems. PGW 520 may, for example, aggregate traffic received from one or more SGWs 520, and may send the aggregated traffic to an external network or another device. PGW 520 may also, or alternatively, receive traffic from an external network and may send the traffic toward UE 100 (via SGW 515 and/or eNB 510).

MME 525 may include one or more computation and communication devices that act as a control node for eNB 510 and/or other devices that provide the air interface for the wireless telecommunications network. For example, MME 525 may perform operations to register UE 100 with the wireless telecommunications network, to establish bearer channels associated with a session with UE 100, to hand off UE 100 to a different eNB 510, MME 525, or another network, and/or to perform other operations.

HSS 120 may include one or more devices that may manage, update, and/or store, in a memory associated with HSS 120, profile information associated with a user or subscriber (e.g., a subscriber associated with UE 100). The profile information may identify applications and/or services that are permitted for and/or accessible by the subscriber, identifying information for UE 100 (e.g., MDN, IMSI, IMEI, etc.), bandwidth or data rate thresholds associated with the applications and/or services, priority class information, and/or other information. Additionally, or alternatively, HSS 120 may perform authentication, authorization, and/or accounting operations associated with the subscriber and/or a communication session with UE 100.

PCRF 535 may include one or more devices that may receive information regarding policies and/or subscriptions from one or more sources, such as subscriber databases and/or from one or more users. PCRF 535 may provide these policies to PGW 520 or another device so that the policies can be enforced. As depicted, in some embodiments, PCRF 535 may communicate with PGW 520 to ensure that charging policies are properly applied to locally routed sessions within the telecommunications network. For instance, after a locally routed session is terminated, PGW 520 may collect charging information regarding the session and provide the charging information to PCRF 535 for enforcement.

CSCF 115 may include one or more computation and communication devices that may gather, process, search, store, and/or provide information in a manner described herein. CSCF 115 may process and/or route messages, calls, etc. to and/or from UE 100 via the EPC. For example, CSCF 115 may process messages or calls, received from an external network, that are destined for UE 100. In another example, CSCF 115 may process messages and/or calls, received from UE 100, that are destined for the external network. In some embodiments, CSCF 115 may handle messages in a prioritized manner, such as messages that include a priority class header, as described herein.

PMC 105 may include one or more computation and communication devices that may gather, process, search, store, and/or provide information in a manner described herein. In some embodiments, PMC 105 may communicate with UE 100 and/or another device or system to register UE 100 with one or more priority classes, in accordance with some embodiments described herein.

For example, PMC 105 may be associated with a web portal or other UI via which an owner and/or operator of the network may associate UE 100 with one or more priority classes, and PMC 105 may store the information associating UE 100 with the one or more priority classes. PMC 105 may be communicatively coupled to CSCF 115, HSS 120, and/or MAS 125 (e.g., via an external network, such as the Internet, and/or some other type of interface or connection). In some embodiments, some or all of the functionality of PMC 105 may be implemented by one or more of CSCF 115, HSS 120, and/or MAS 125. By way of the communicative coupling to, and/or the implementation by, CSCF 115, HSS 120, and/or MAS 125, these devices and/or systems may be able to retrieve and/or store the priority class information for one or more UEs 100.

MAS 125 may include one or more devices that may store, forward, convert, and deliver messages. In some embodiments, MAS 125 may include, may be communicatively coupled to, and/or be implemented by an SMS Center ("SMSC"). In some implementation, MAS 125 may receive and respond to instructions from UE 100 to send a message (e.g., an SMS message and/or some other type of message) to another UE 100. MAS 125 may include, and/or communicate with, a messaging gateway for communicating with one or more other messaging gateways (e.g., a messaging gateway of another network). In some embodiments, MAS 125 may handle messages in a prioritized manner, such as messages that include a priority class header, as described herein.

The quantity of devices and/or networks, illustrated in FIG. 5, is provided for explanatory purposes only. In practice, environment 500 may include additional devices and/or networks; fewer devices and/or networks; different devices and/or networks; or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another device of environment 500. Additionally, the devices of environment 500 may interconnect with each other, and/or other devices, via wired connections, wireless connections, or a combination of wired and wireless connections. In some embodiments, one or more devices of environment 500 may be physically integrated in, and/or may be physically attached to, one or more other devices of environment 500. Also, while "direct" connections are shown in FIG. 5 between certain devices, some devices may communicate with each other via one or more additional devices and/or networks.

Figure 6:
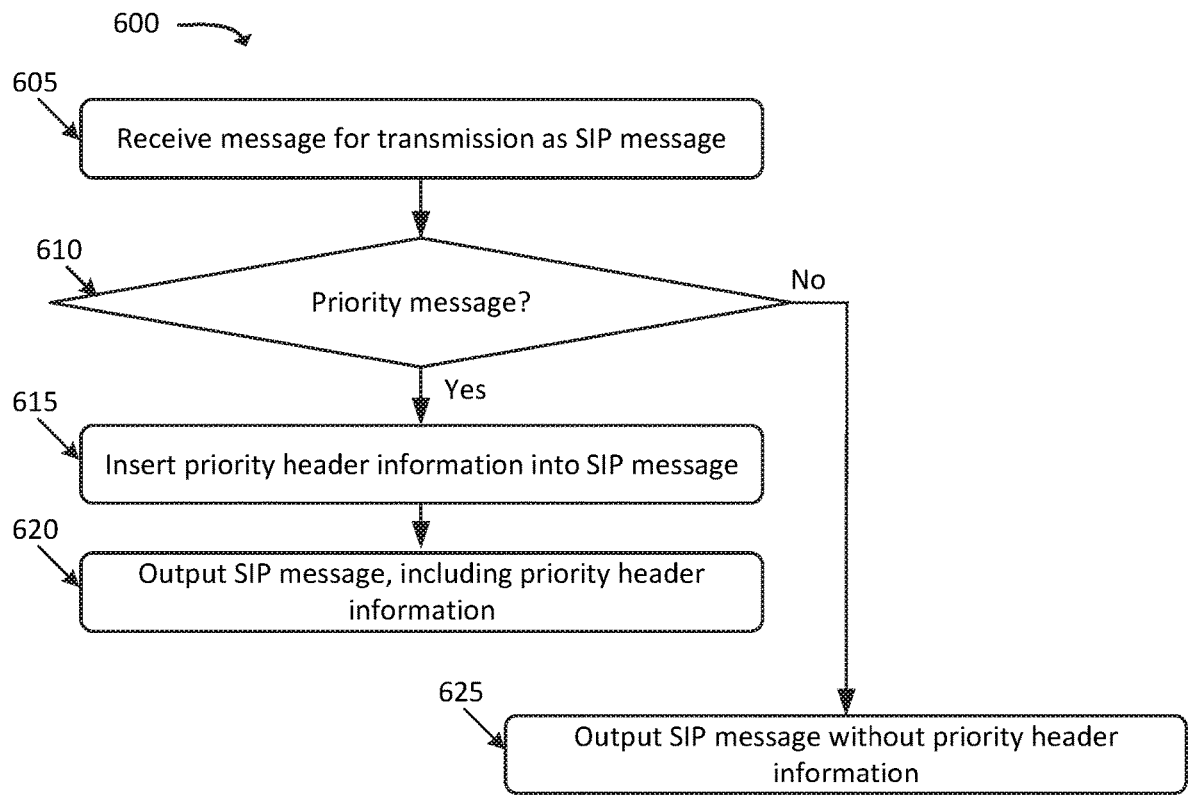
FIG. 6 illustrates an example process, which may be performed by a UE, for indicating a priority class in a message.

FIG. 6 illustrates a process 600 for indicating a priority class in a message to be sent, in accordance with embodiments described herein. In some embodiments, some or all of process 600 may be performed by UE 100.

As shown, process 600 may include receiving (at 605) a message for transmission as an SIP message. For example, UE 100 may receive (e.g., via a messaging application such as messaging application 315) a message that is to be transmitted using SIP messaging. UE 100 may, for instance, receive user input (e.g., via a UI of messaging application 315, such as UI 400) that corresponds to a message to be sent from UE 100. In some embodiments, messaging application 315 may be configured to use SIP messaging to output messages.

Process 600 may further include determining (at 610) whether the message is associated with a priority class. For example, as discussed above, a user of UE 100 may indicate (e.g., via actuating a selectable object in a UI, such as button 403 or button 404) a desired priority class of the message. In some embodiments, UE 100 may determine the priority class of the message by analyzing the content of the message. In some embodiments, UE 100 may determine the priority class of the message based on the type of message (e.g., SMS messages may have one priority class, while instant messages may have another priority class). In some embodiments, UE 100 may forgo determining the priority class (e.g., in embodiments where messages from UE 100 are automatically associated with a particular priority class).

If the message is associated with a priority class (at 610—YES), then process 600 may additionally include inserting (at 620) priority header information into the SIP message. For example, UE 100 may indicate the determined priority class in a header of the SIP message, as discussed above. Process 600 may further include outputting (at 625) the SIP message, including the priority header information. The SIP message may be processed in a prioritized manner by the network, in accordance with the indicated priority class.

If, on the other hand, the message is not associated with a priority class (at 610—NO), process 600 may include outputting (at 630) an SIP message, that includes the message (received at 605), without priority header information. The SIP message may thus be processed in a "best effort" manner by the network.

Figure 7:
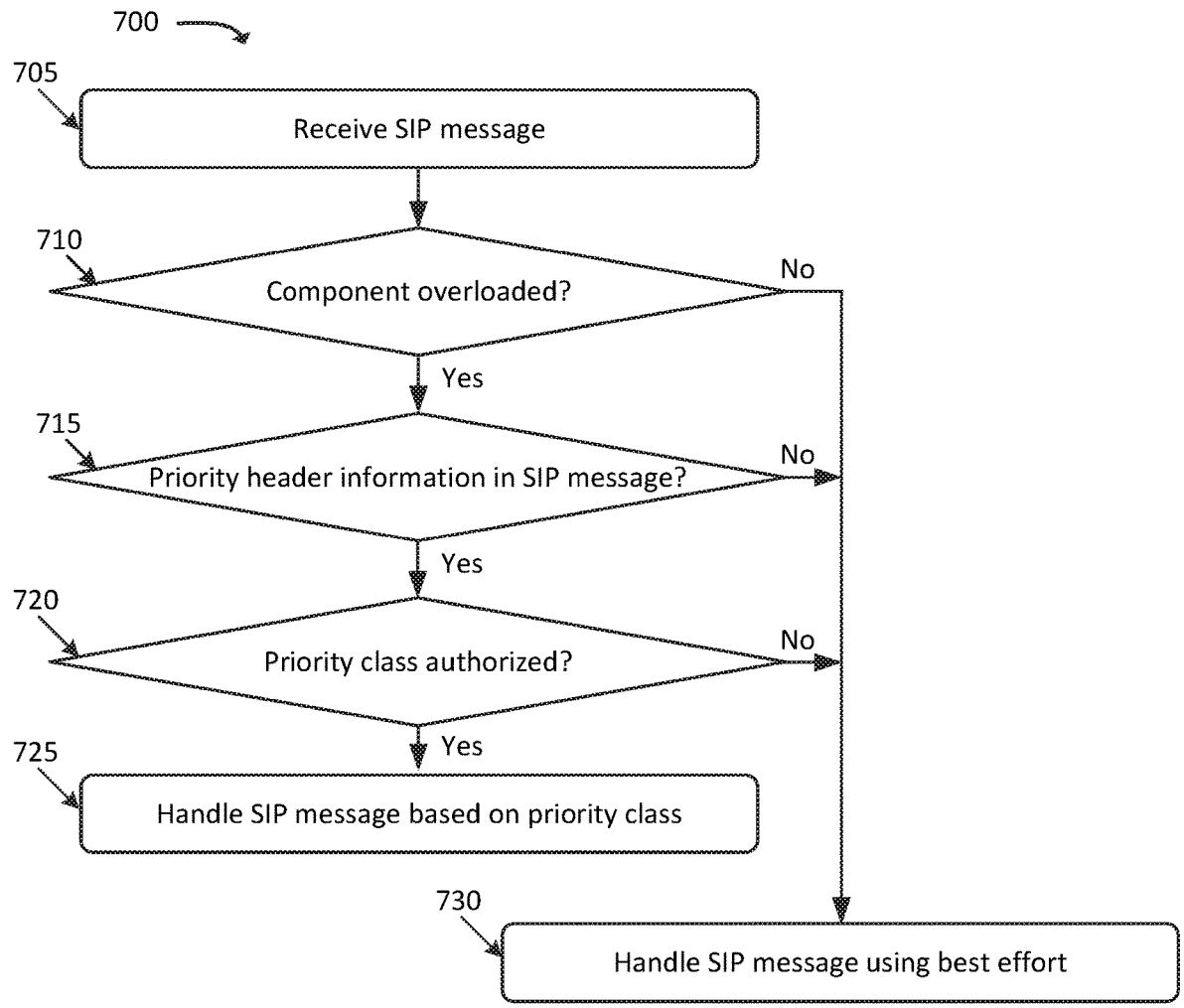
FIG. 7 illustrates an example process, which may be performed by a network component, for handling a message in accordance with a priority class indicated in the message.

FIG. 7 illustrates a process 700 for handling a message in accordance with a priority class indicated in the message, in accordance with embodiments described herein. In some embodiments, some or all of process 700 may be performed by CSCF 115, MAS 125, and/or some other device or component that is capable of prioritizing traffic based on a priority class indicator in an SIP header. For example, some or all of process 700 may be performed by CSCF 115, in order for CSCF 115 to handle the message in accordance with the priority class indicated in the message, and may also be performed by MAS 125, in order for MAS 125 to handle the message in accordance with the priority class indicated in the message. For the sake of brevity, process 700 is described below in the context of being performed by a CSCF 115. However, MAS 125 and/or another device may also perform the same, or similar, functions.

As shown, process 700 may include receiving (at 705) an SIP message. For example, CSCF 115 may receive an SIP message from UE 100 (e.g., via one or more other devices or systems, such as SGW 515 and PGW 520).

Process 700 may further include determining (at 710) whether the component is overloaded. For instance, CSCF 115 may determine whether CSCF 115 is overloaded, such that the delivery of messages may be delayed (e.g., as compared to when CSCF 115 is not overloaded).

If the component is overloaded (at 710—YES), process 700 may additionally include determining (at 715) whether the SIP message includes priority header information. For example, CSCF 115 may determine whether the SIP message includes, in an SIP header, an indicator of a priority class.

If the SIP message includes the priority header information, process 700 may also include verifying (at 720) whether UE 100 is authorized for the priority class indicated in the priority header information. For example, CSCF 115 may query HSS 120 and/or PMC 105 to determine whether UE 100 (and/or whether the type of message) is authorized for the indicated priority class.

If UE 100 is authorized for the indicated priority class at 720—YES), process 700 may further include handling (at 725) the SIP message based on the indicated priority class. For example, CSCF 115 may prioritize the queueing, forwarding, or other processing/handling of the message over messages that have a lower priority class (or no priority class, such as "best effort" traffic). If the component is not overloaded (at 710—NO), the SIP message does not include priority header information (at 715—NO), and/or UE 100 is not authorized for the priority class indicated in the SIP header (at 720—NO), then process 700 may include handling (at 730) the SIP message as "best effort" traffic.

Figure 8:
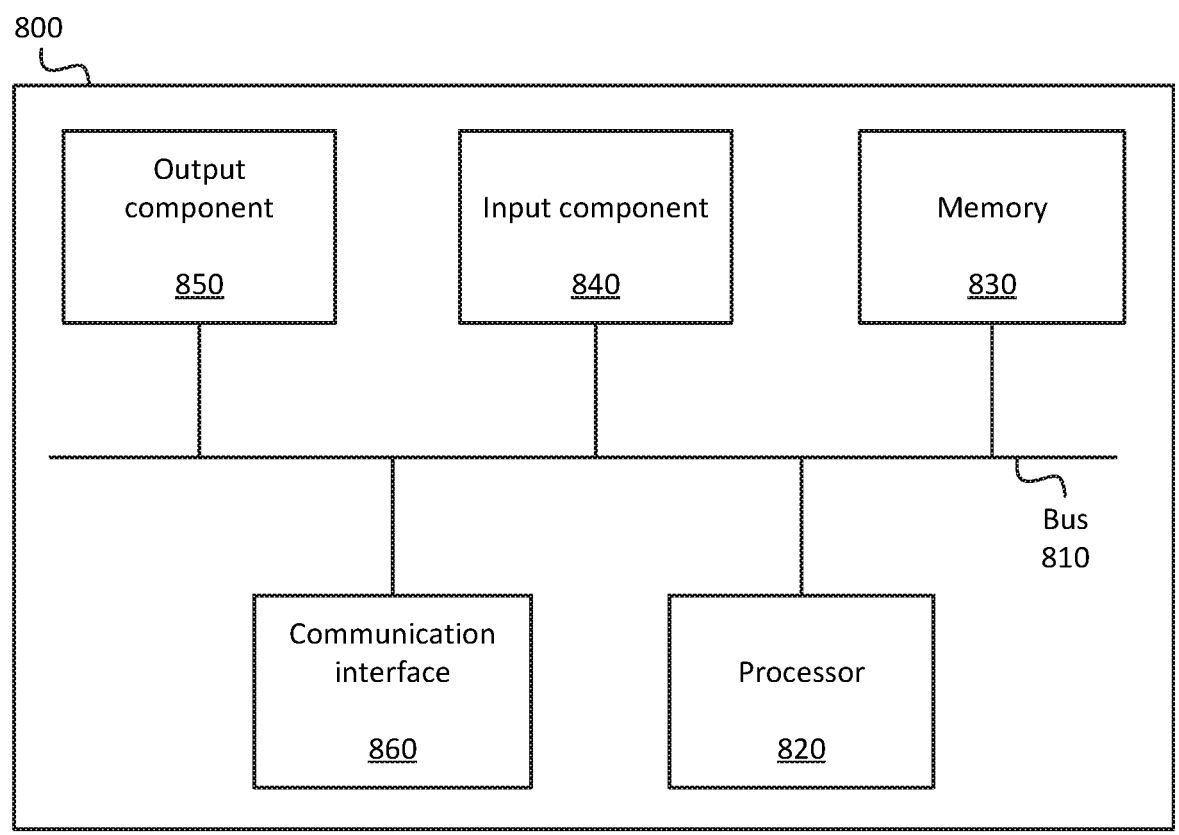
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2, 6, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        receive input specifying a particular message that is to be transmitted from the device;
        determine that the particular message is associated with a particular priority class;
        determine that the particular message will be transmitted as part of a Session Initiation Protocol ("SIP") message;
        insert, into a header of the SIP message, an indicator of the particular priority class; and
        output the SIP message, including the particular message and the header that includes the indicator, to a network, wherein one or more components of the network prioritize the SIP message over one or more other SIP messages based on the indicator included in the header of the SIP message.

2. The device of claim 1, wherein the particular message includes at least one of:
    a Short Message Service ("SMS") message,
    an Multimedia Messaging Service ("MMS") message, or
    an instant message.

3. The device of claim 1, wherein the one or more processors are further configured to:
    register the device with a Priority Messaging Component ("PMC") as being associated with the particular priority class;
    receive, as part of the registering, an authentication token; and
    insert, into the header of the SIP message, the authentication token, wherein at least one of the one or more components of the network verify the authentication token with the PMC before prioritizing the SIP message.

4. The device of claim 1, wherein inserting the indicator of the determined particular priority class into the header further comprises:
    inserting the indicator into a "Resource-Priority" field of the header.

5. The device of claim 1, wherein determining that the SIP message is associated with the particular priority class further comprises:
    obtaining information, indicating the particular priority class, from a Universal Integrated Circuit Card ("UICC") associated with the device.

6. The device of claim 5, wherein obtaining the information from the UICC further comprises:
    obtaining the information from an Access Control Class ("ACC") Elementary File ("EF") associated with the UICC.

7. The device of claim 1, wherein determining that the SIP message is associated with the particular priority class further comprises:

determining a score based on content of the SIP message;
determining that the score exceeds a threshold score associated with the particular priority class; and
determining that the SIP message is associated with the particular priority class based on the determination that the score exceeds the threshold score.

8. A non-transitory computer-readable medium, storing a plurality of processor-executable instructions, which, when executed by one or more processors, cause the one or more processors to:
receive input specifying a particular message that is to be transmitted from the device;
determine that the particular message is associated with a particular priority class;
determine that the particular message will be transmitted as part of a Session Initiation Protocol ("SIP") message;
insert, into a header of the SIP message, an indicator of the particular priority class; and
output the SIP message, including the particular message and the header that includes the indicator, to a network, wherein one or more components of the network prioritize the SIP message over one or more other SIP messages based on the indicator included in the header of the SIP message.

9. The non-transitory computer-readable medium of claim 8, wherein the particular message includes at least one of:
a Short Message Service ("SMS") message,
an Multimedia Messaging Service ("MMS") message, or
an instant message.

10. The non-transitory computer-readable medium of claim 8, wherein the processor-executable instructions further comprise processor-executable instructions to:
register the device with a Priority Messaging Component ("PMC") as being associated with the particular priority class;
receive, as part of the registering, an authentication token; and
insert, into the header of the SIP message, the authentication token, wherein at least one of the one or more components of the network verify the authentication token with the PMC before prioritizing the SIP message.

11. The non-transitory computer-readable medium of claim 8, wherein the processor-executable instructions, to insert the indicator of the determined particular priority class into the header, further include processor-executable instructions to:
insert the indicator into a "Resource-Priority" field of the header.

12. The non-transitory computer-readable medium of claim 8, wherein the processor-executable instructions, to determine that the SIP message is associated with the particular priority class, further include processor-executable instructions to:
obtain information, indicating the particular priority class, from a Universal Integrated Circuit Card ("UICC") associated with the device.

13. The non-transitory computer-readable medium of claim 12, wherein the processor-executable instructions, to obtain the information from the UICC, further include processor-executable instructions to:
obtain the information from an Access Control Class ("ACC") Elementary File ("EF") associated with the UICC.

14. The non-transitory computer-readable medium of claim 8, wherein the processor-executable instructions, to determine that the SIP message is associated with the particular priority class, further include processor-executable instructions to:
determine a score based on content of the SIP message;
determine that the score exceeds a threshold score associated with the particular priority class; and
determine that the SIP message is associated with the particular priority class based on the determination that the score exceeds the threshold score.

15. A method, comprising:
receiving, by a device, input specifying a particular message that is to be transmitted from the device;
determining, by the device, that the particular message is associated with a particular priority class;
determining, by the device, that the particular message will be transmitted as part of a Session Initiation Protocol ("SIP") message;
inserting, by the device, into a header of the SIP message, an indicator of the particular priority class; and
outputting, by the device, the SIP message, including the particular message and the header that includes the indicator, to a network, wherein one or more components of the network prioritize the SIP message over one or more other SIP messages based on the indicator included in the header of the SIP message.

16. The method of claim 15, wherein the particular message includes at least one of:
a Short Message Service ("SMS") message,
an Multimedia Messaging Service ("MMS") message, or
an instant message.

17. The method of claim 15, further comprising:
registering the device with a Priority Messaging Component ("PMC") as being associated with the particular priority class;
receiving, as part of the registering, an authentication token; and
inserting, into the header of the SIP message, the authentication token, wherein at least one of the one or more components of the network verify the authentication token with the PMC before prioritizing the SIP message.

18. The method of claim 15, wherein inserting the indicator of the determined particular priority class into the header further comprises:
inserting the indicator into a "Resource-Priority" field of the header.

19. The method of claim 15, wherein determining that the SIP message is associated with the particular priority class further comprises:
obtaining information, indicating the particular priority class, from an Access Control Class ("ACC") Elementary File ("EF") associated with a Universal Integrated Circuit Card ("UICC") associated with the device.

20. The method of claim 15, wherein determining that the SIP message is associated with the particular priority class comprises:
determining a score based on content of the SIP message;
determining that the score exceeds a threshold score associated with the particular priority class; and
determining that the SIP message is associated with the particular priority class based on the determination that the score exceeds the threshold score.

* * * * *